United States Patent [19]
Takita

[11] Patent Number: 5,634,139
[45] Date of Patent: May 27, 1997

[54] MICROPROCESSOR USING FEEDBACK MEMORY ADDRESS TO INTERNALLY GENERATE BUST MODE TRANSFER PERIOD SIGNAL FOR CONTROLLING BURST MODE DATA TRANSFER TO EXTERNAL MEMORY

[75] Inventor: Kazuhiko Takita, Kanagawa, Japan

[73] Assignee: NEC Corporation, Tokyo, Japan

[21] Appl. No.: 429,088

[22] Filed: Apr. 26, 1995

[30] Foreign Application Priority Data

Apr. 26, 1994 [JP] Japan ..................... 6-088908

[51] Int. Cl.⁶ ................................ G06F 13/28
[52] U.S. Cl. .................. 395/855; 395/880; 395/881
[58] Field of Search ..................... 395/474, 200.01, 395/855, 162, 496, 299, 445, 427; 364/283.4, 200; 340/233.5, 825.06; 365/230.08

[56] References Cited

U.S. PATENT DOCUMENTS

| 4,860,198 | 8/1989 | Takenaka | 364/200 |
|---|---|---|---|
| 5,014,188 | 5/1991 | Kawamura | 364/200 |
| 5,291,580 | 3/1994 | Bowden, III et al. | 395/425 |
| 5,467,461 | 11/1995 | Nasu et al. | 395/474 |

FOREIGN PATENT DOCUMENTS

| 0346917 | 12/1989 | European Pat. Off. . |
|---|---|---|
| 0479428 | 4/1992 | European Pat. Off. . |
| 3-134754 | 6/1991 | Japan . |

OTHER PUBLICATIONS

IBM Technical Disclosure Bulletin, "Method to Generate An Automatic Wait–State During Direct Memory Access", vol. 29., No. 2 (1986) pp. 875–878.

*Primary Examiner*—Thomas C. Lee
*Assistant Examiner*—San You Nahm
*Attorney, Agent, or Firm*—Foley & Lardner

[57] ABSTRACT

A data processing system comprises a microprocessor having a burst mode transfer function, a memory receiving an address supplied from said microprocessor to output data designated by the received address, an address decoder receiving and decoding said address supplied from said microprocessor, and a memory control circuit receiving an output of said address decoder and control signals from said microprocessor, for controlling said memory. The system is configured to generate a burst mode transfer period designating signal indicating a period of a burst mode transfer, so that a synchronous burst mode transfer is performed in accordance with the period of the burst mode transfer designated by said burst mode transfer period designating signal, so as to cause said microcomputer to fetch data transferred from said memory by the synchronous burst mode transfer.

16 Claims, 18 Drawing Sheets

MICROPROCESSOR USING FEEDBACK MEMORY ADDRESS TO INTERNALLY GENERATE BUST MODE TRANSFER PERIOD SIGNAL FOR CONTROLLING BURST MODE DATA TRANSFER TO EXTERNAL MEMORY

BACKGROUND OF THE INVENTION

1. Field of the Invention

The present invention relates to a data processing system for transferring data in a burst mode transfer between a microprocessor and a memory which are coupled through a system bus.

2. Description of Related Art

Microprocessors show a yearly elevation of their performance and function, and the operating frequency is also elevating to 25 MHz, then to 33 MHz, and further to 50 MHz. On the other hand, an external memory ordinarily used for supplying instructions and data to the microprocessor has only a data transfer rate which is still lower than the operating speed of the microcomputer, although a memory having a high transfer rate has recently appeared but it is expensive. Therefore, the data transfer rate between the microprocessor and the memory has a large influence on overall performance of a system. Most recent microprocessors internally contain a cache memory so that frequently used data is stored in the cache memory for compensating for a difference in the data transfer rate between the microprocessor and the external memory. Even in this case, however, the data transfer rate in the data transfer from the external memory to the microprocessor lowers the performance of the system.

In most microprocessors internally containing the cache memory, the data transfer to the cache memory is performed in a burst mode. Here, the "burst mode" transfer means a data transfer manner in which data is continuously transferred from an external memory to a block having a series of continuous addresses.

One typical example of a synchronous burst transfer is disclosed in Japanese Patent Application Laid-open Publication JP-A-3-134754 titled "DATA PROCESSING SYSTEM", which will be now described with reference to FIG. 1. The data processing system includes a microprocessor 101, an address decoder 102, a memory control circuit 103a and a memory 104, which are coupled as shown. The microprocessor 101 and the memory 104 are coupled to an external data bus 109 so that data can be transferred through the external data bus 109 between the microprocessor 101 and the memory 104.

Operation of this data processing system in a burst mode transfer will be explained with reference to FIG. 2 showing a timing chart of the data transfer system. First, the microprocessor 101 outputs an effective address 105, and activates a bus cycle start signal (ADS) 106 and a read/write signal (R/W) 107. If an address region to be accessed comes within a cache region, the microprocessor 101 activates a synchronous block transfer request signal (BLOCK) 108.

The address decoder 102 decodes the received address 105, and informs the memory control circuit 103a of whether an address designated region is a high speed memory region or a middle or low speed memory region. In general, a microprocessor based system uses, as a memory, an EPROM (electrically programmable read only memory), DRAM (dynamic random access memory), SRAM (static random access memory), etc. which are selected on the basis of an address.

Since this selection of memory is made within a region of continuous addresses, the address decoder 102 can be formed by for example an address discrimination circuit shown in FIG. 3, which receives the most significant two bits A[31: 30] of a 32-bit address 105 and includes two inverters 140 and 142 and two AND circuits 141 and 143 connected as shown so as to discriminate the memory region (high speed, middle speed or low speed) on the basis of the most significant two bits A[31: 30] of the address.

When the address designated region is the high speed memory region, the memory control circuit 103a receiving the ADS signal 106, the R/W signal 107 and the BLOCK signal 108, outputs a chip select signal CS and a write/read signal WR to the memory 104, and activates a burst transfer enabling signal (BLOCKF) 201 so as to enable a burst transfer and to change the status in synchronism with operation of the microprocessor so as to control the memory. This status transition diagram is shown in FIG. 4. In accordance with the instruction of the BLOCKF signal 102, the microprocessor performs the burst transfer. Therefore, a synchronous burst mode transfer can be performed between the memory and the microprocessor.

When the address designated region is the middle or low speed memory region, the memory control circuit 103 does not enable the burst mode transfer by the burst mode transfer enabling signal BLOCKF 201 as shown in FIG. 5, but a non-burst mode transfer (asynchronous data transfer) in which data is transferred item by item, is performed. In this non-burst mode transfer, the memory control circuit 103 adjust a data set signal (DS) 202 supplied to the microprocessor 101, dependently upon a performance of a memory allocated to a designated address region, so that a time until a data access is adjusted. This DS signal 202 is generated from the ADS signal 106 by for example a circuit shown in FIG. 6, which receives the ADS signal 106 and includes two cascaded delay circuits 144 and 145 and a selector 146 receiving an output of each of the delay circuits and controlled on the basis of whether the designated address region is the middle speed memory region or the low speed memory region.

In the non-burst mode transfer, the above mentioned conventional system can comply with a memory having any performance. In addition, the conventional system can simplify the control of the status transition for the synchronous burst mode transfer, and therefore, can speed up the change of the cache address and the writing to the cache memory.

Now, as a second conventional example configured to perform the burst mode transfer in an asynchronous mode, the microprocessor "i486" available rom Intel Corporation in the U.S.A. will be explained with reference to FIG. 7. In FIG. 7, elements similar to those shown in FIG. 1 are given the same Reference Numerals.

As shown in FIG. 7, the microprocessor 101 outputs an effective address 105, and activates a bus cycle start signal (ADS) 106 and a read/write signal (R/W) 107. The address decoder 102 decodes the address 105 to discriminate an address designated region and to notify the result of the discrimination to a memory control circuit 103b.

The memory control circuit 103b receives the ADS signal 106 and the R/W signal 107. In addition, depending upon the performance of the memory 104 allocated to the address designated region, the memory control circuit 103b cyclicly changes a burst ready signal (BRDY) 203 indicating that data is set in the burst transfer mode, and also controls the memory 104. In accordance with the value of the BRDY signal 203, the microprocessor 101 changes its status as shown in the status transition diagram of FIG. 8, so that data is fetched into the microprocessor 101 from the memory 104.

Referring to FIG. 9, there is shown an example of a BRDY signal generating circuit 210 included in the memory control circuit 103b. This BRDY signal generating circuit 210 includes a down counter 211 for counting a delay value, an up counter 212 for counting the number of items to be transferred, a delay value setting circuit 213, delay circuits 144 and 145, inverters 147 and 148 and a selector 149, which are connected as shown.

First, an input value to be supplied to the down counter 211 is determined on the basis of the result of the address decoding. When the bus cycle starts, the up counter 212 is reset to "0" by the ADS signal 106. After one cycle from the ADS signal 106, a delay value is loaded to the down counter 211 from the delay value setting circuit 213, and after a further one cycle, the down counter starts its count-down operation so that the value of the down counter 211 is decremented for each clock. When the value of the down counter 211 becomes "0", the down counter 211 outputs a high level signal from its output "OUT", and then, returns to the delay value so as to restart its count-down operation. The output of the down counter 211 is inverted by the inverter 148 so as to generate the BRDY signal 203.

On the other hand, the up counter 212 counts up in response to the output of the down counter 211 so as to count the number of items transferred, as "0"→"1"→"2"→"3"→"4". When the value of the up counter 212 becomes "4", the up counter 212 generates a high level output signal, which is supplied to a stop input of the down counter 211, so that the down counter 211 stops its its count-down operation.

As mentioned above, since the status changes in accordance with the value of the BRDY signal 203, the data transfer between the microprocessor and the memory becomes an asynchronous burst transfer.

As examples of the operation timing of the second conventional system, FIG. 10 shows a timing chart of a no-wait burst mode transfer, and FIG. 11 shows a timing chart of a one-wait burst mode transfer. As seen from comparison between FIGS. 10 and 11, it is possible to control the wait in the burst mode transfer by the BRDY signal 203. In a middle speed DRAM memory, accordingly, the burst mode transfer becomes possible by using a page mode, and therefore, the data transfer rate can be increased in comparison with the non-burst mode transfer.

In the above mentioned first conventional example, in order to elevate the system performance by increasing the data transfer rate, it is necessary to increase a high speed memory which allows the burst mode transfer, which will result in an increased system cost. For example, assuming that the operating frequency of the microprocessor 101 is 33 MHz (one cycle=30 ns), the address output delay time is 10 ns, and the data input setting time is 10 ns, since the memory 104 is required to have the access time of not greater than 10 ns, an expensive SRAM becomes required. In order to suppress the system cost, if an inexpensive but low transfer rate memory is used and if the data transfer is performed in the non-burst mode transfer or if the clock frequency of the burst mode transfer is lowered, the performance inevitably greatly drops.

The first conventional example was effective when the processing speed of the microprocessor was not so high in comparison with the memory. However, as the processing speed of the microprocessor has remarkably elevated, the first conventional example can no longer meet with the recent technical trend, and therefore, the second conventional example has been adopted. However, the second conventional example has different problems.

In the second conventional example, after the BRDY signal 203 is fetched, a next internal status is fixed. Therefore, in the case of attempting to speed up the operation from the data fetching to the writing of the cache, the no-wait asynchronous burst mode transfer can write to the cache at the same timing as the conventional synchronous transfer shown in FIG. 4, as seen from FIG. 10. However, if the wait is inserted, as shown in FIG. 11, a cycle occupying the internal data bus is inserted to await for the data setting or fixing. Assuming that one block of the cache includes "m" words and the number of waits is "n", the number of cycles required for waiting for internal data setting or fixing becomes "m×n".

In order to minimize the number of cycles required for waiting for internal data setting or fixing (the internal bus occupation), if four stages of read buffer are provided to continuously write the cache memory, the timing becomes as shown in FIG. 12. As seen from comparison between FIG. 12 and FIG 10 in which the writing to the cache is speeded up, the time until the last data has been written is elongated by four cycles. In the asynchronous burst mode transfer, there is required an external counter for changing the period of the data setting signal.

SUMMARY OF THE INVENTION

Accordingly, it is an object of the present invention to provide a data processing system which has overcome the above mentioned defect of the conventional ones.

Another object of the present invention is to provide a data processing system having an increased data transfer rate.

The above and other objects of the present invention are achieved in accordance with the present invention by a data processing system comprising:

a microprocessor having a burst mode transfer function;

a memory receiving an address supplied from the microprocessor to output data designated by the received address;

an address decoder receiving and decoding the address supplied from the microprocessor;

a memory control circuit receiving an output of the address decoder and control signal from the microprocessor, for controlling the memory; and burst mode transfer period designating means for generating a burst mode transfer period designating signal indicating a period of a burst mode transfer, so that at the time of the burst mode transfer, a synchronous burst mode transfer is performed in accordance with the period of the burst mode transfer designated by the burst mode transfer period designating signal, so as to cause the microcomputer to fetch data transferred from the memory by the synchronous burst mode transfer.

In one embodiment, the burst mode transfer period designating means includes "n" burst mode transfer period designating input terminals, and the synchronous burst mode transfer is performed in accordance with one period of "$2^n$" different periods designated by "n" burst mode transfer period designating signals simultaneously fetched through the "n" burst mode transfer period designating input terminals, respectively.

In another embodiment, the burst mode transfer period designating means includes a single burst mode transfer period designating input terminal, and the synchronous burst mode transfer is performed by changing the burst mode transfer period designating signal during a few continuous clocks so as to designate the burst mode transfer period.

Furthermore, an internal bus interface unit of the microprocessor can fix its status transition in accordance with the burst mode transfer period designating means, so that an internal bus is open to another internal unit in an internal bus empty time slot during the burst mode transfer period.

The above and other objects, features and advantages of the present invention will be apparent from the following description of preferred embodiments of the invention with reference to the accompanying drawings.

DESCRIPTION OF THE PREFERRED EMBODIMENTS

Figure 1:
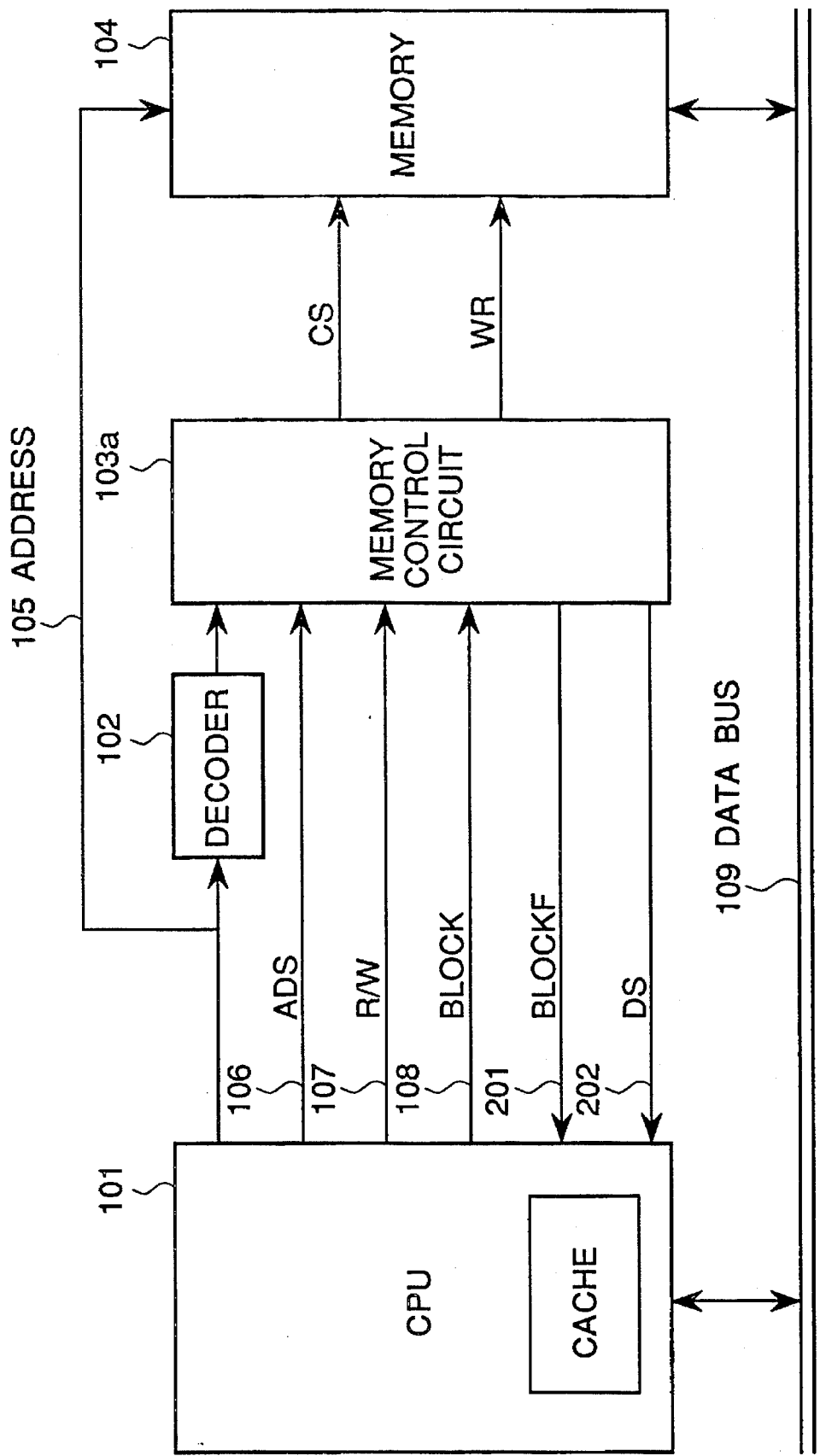
FIG. 1 is a block diagram of a first conventional data processing system capable of transferring data between a microprocessor and a memory.
Figure 2:
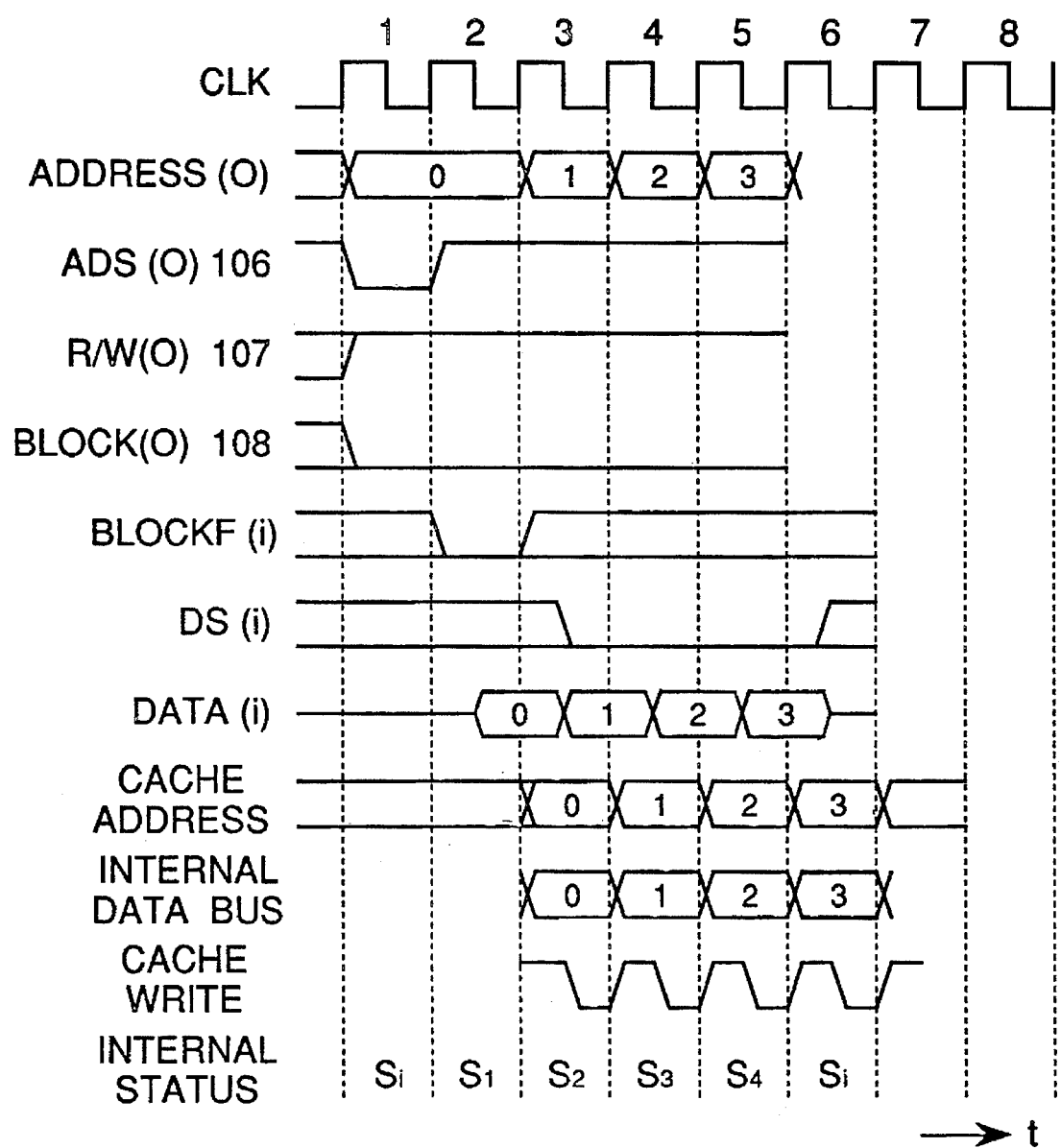
FIG. 2 is a timing chart of a synchronous burst mode transfer in the system shown in FIG. 1.
Figure 3:
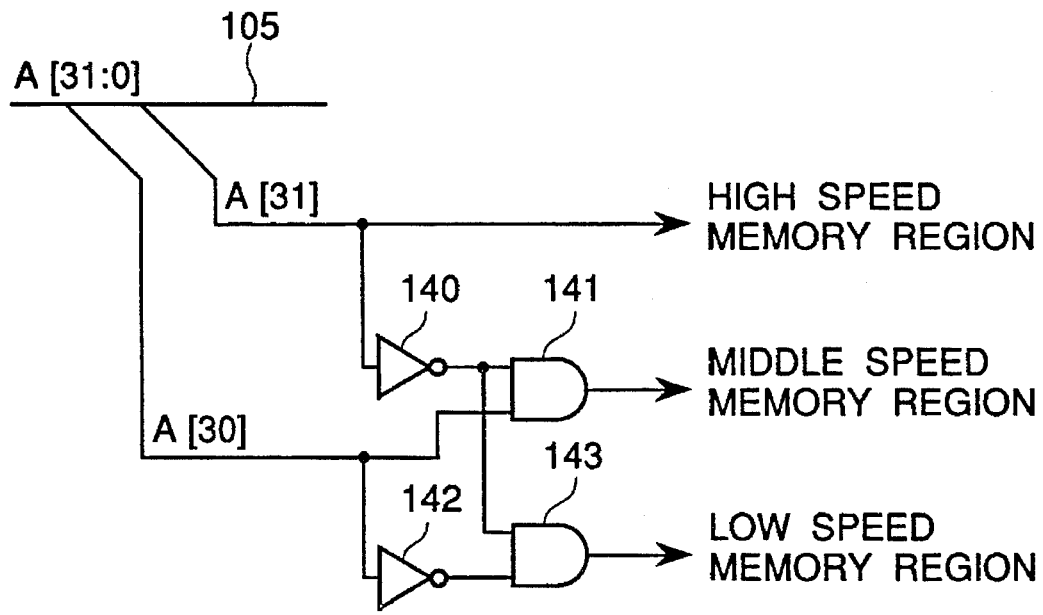
FIG. 3 is a circuit diagram showing one example of the address decoder included in the system shown in FIG. 1.
Figure 4:
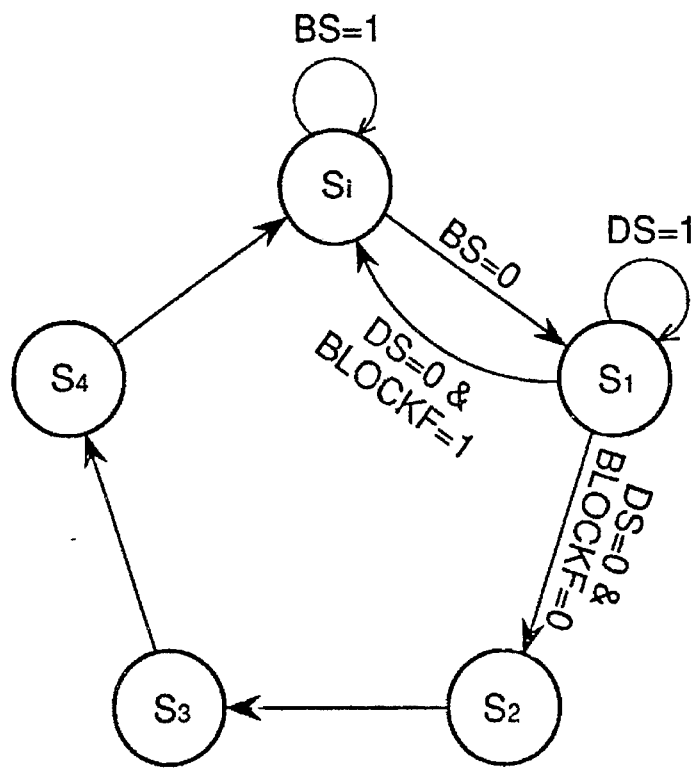
FIG. 4 is a status transition diagram of the operation of the system shown in FIG. 1.
Figure 5:
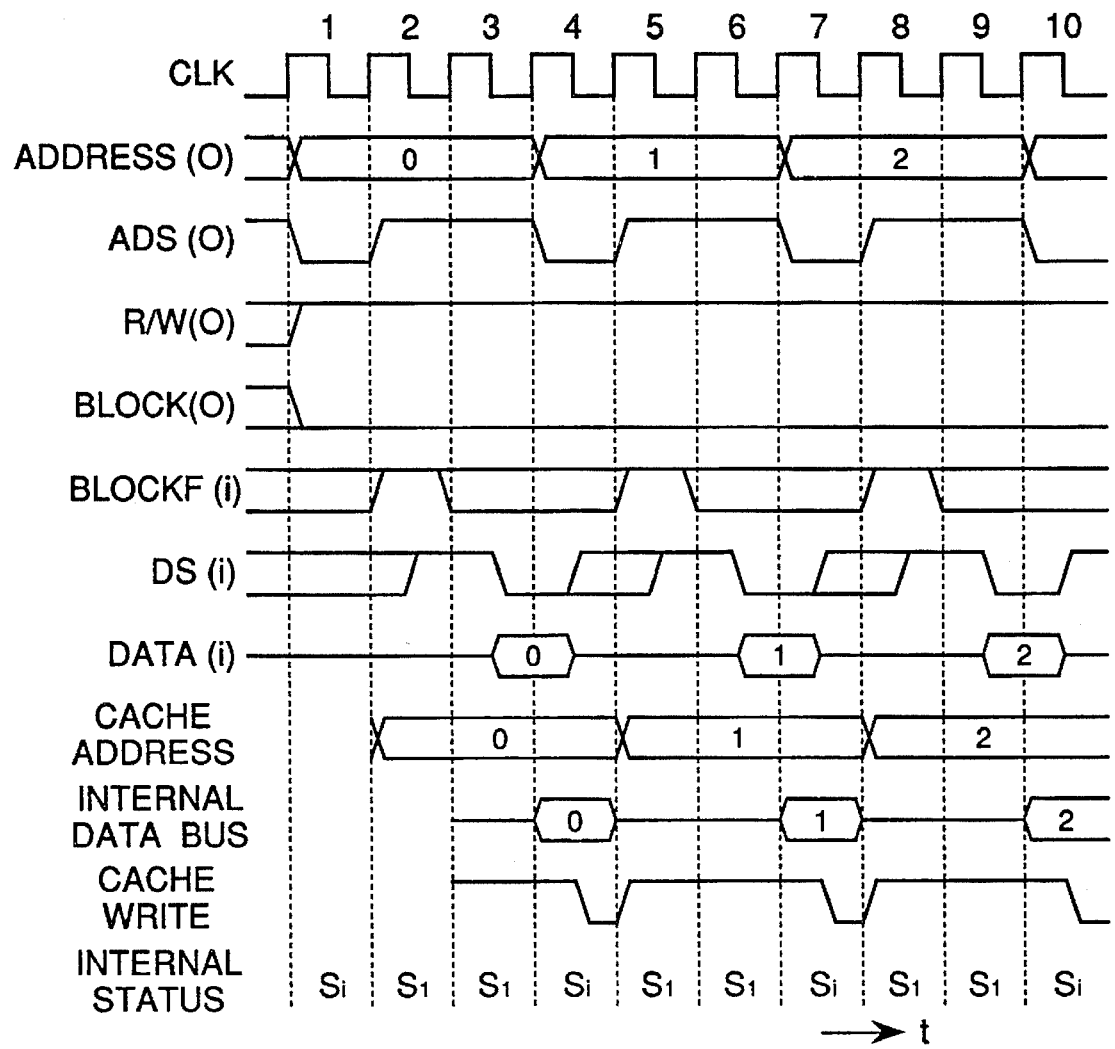
FIG. 5 is a timing chart of a non-burst mode transfer in the system shown in FIG. 1.
Figure 6:
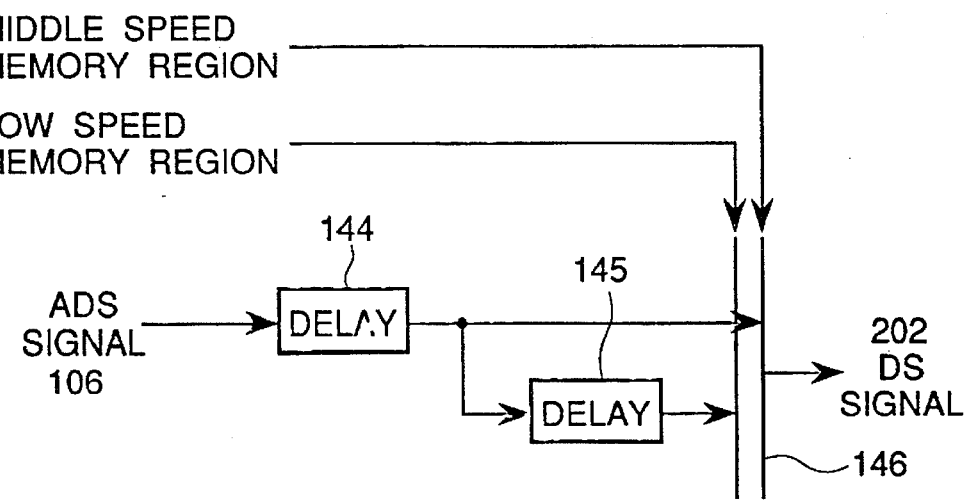
FIG. 6 is a circuit diagram showing one example of the DS signal generating circuit included in the system shown in FIG. 1.
Figure 7:
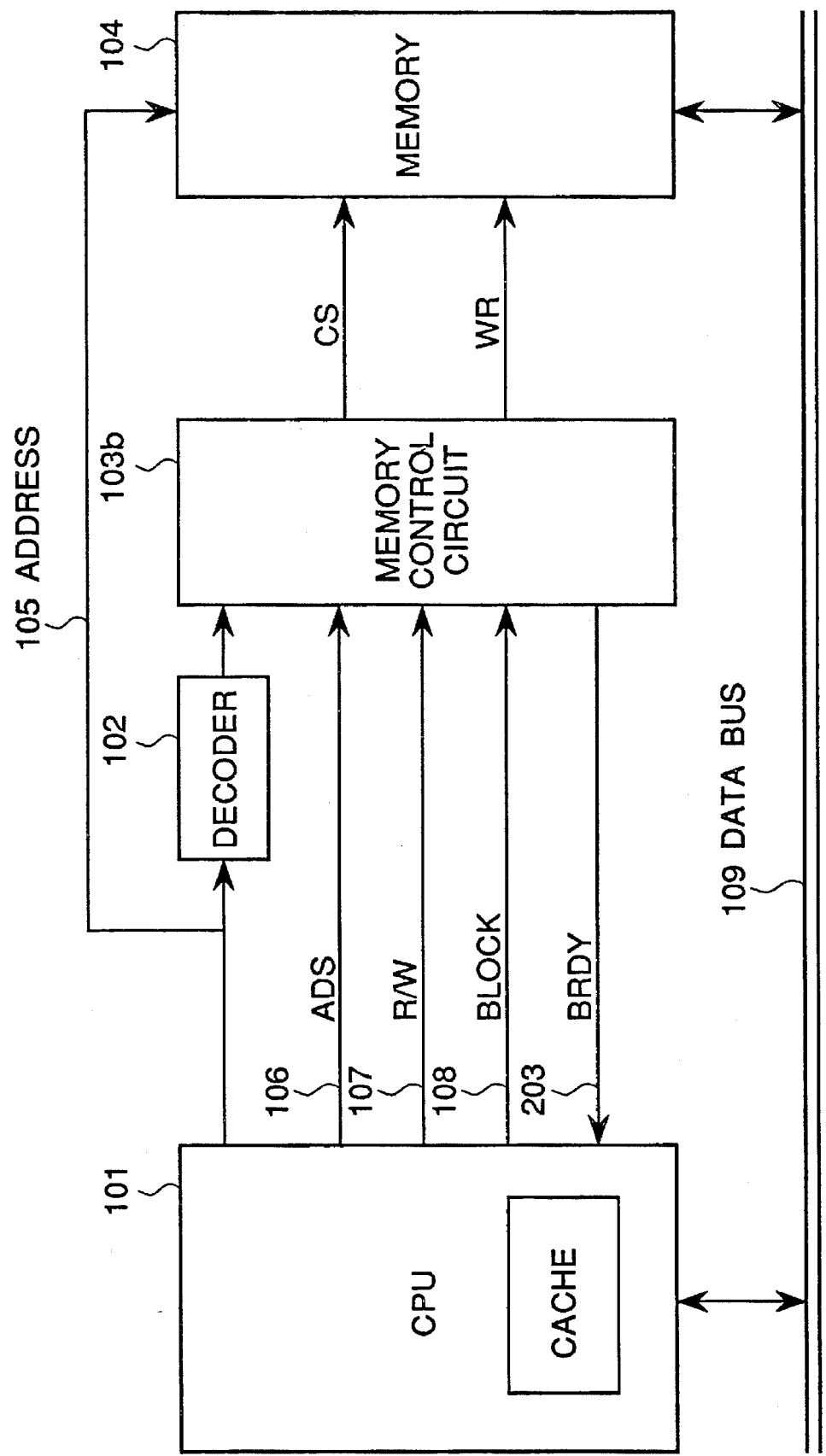
FIG. 7 is a block diagram of a second conventional data processing system capable of transferring data between a microprocessor and a memory.
Figure 8:
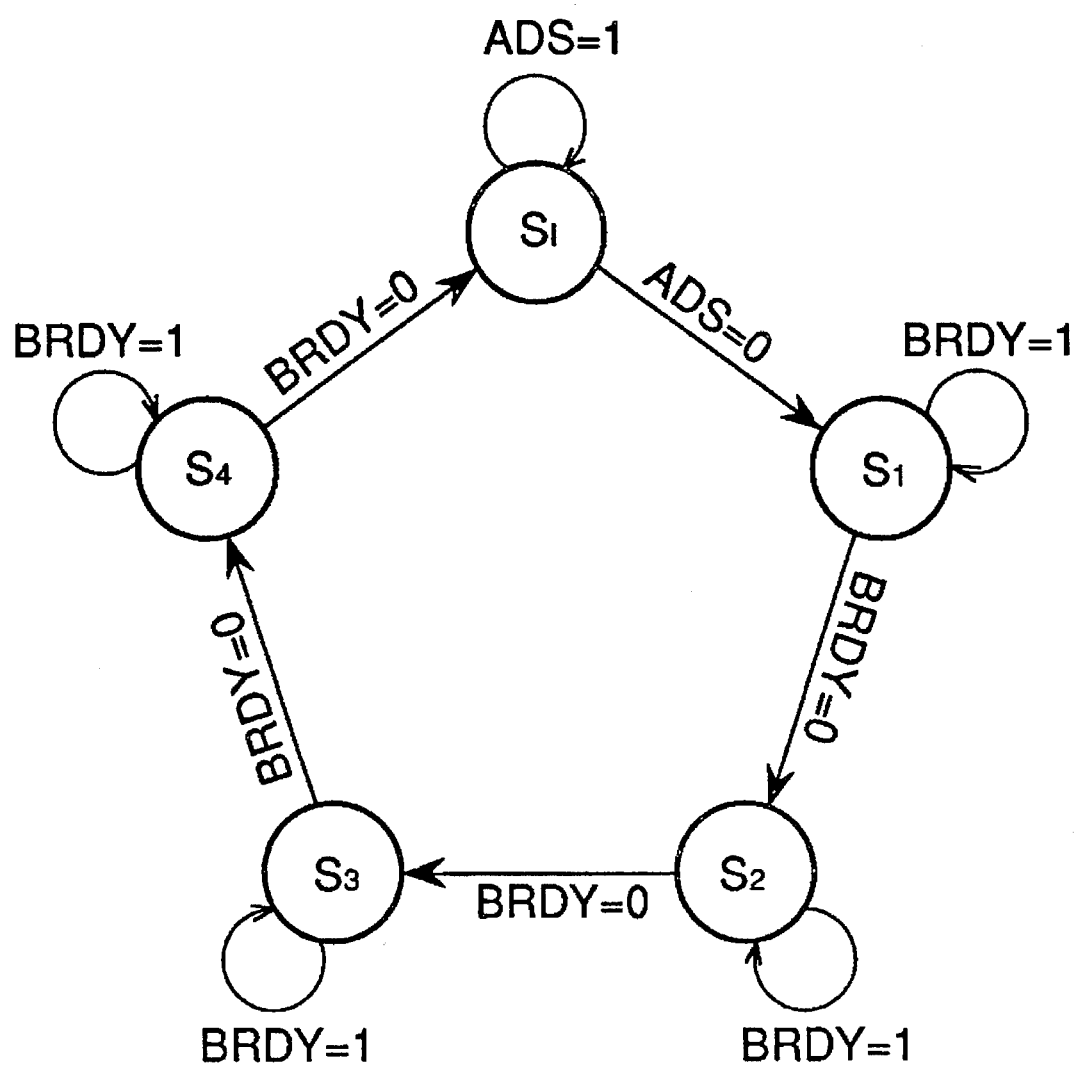
FIG. 8 is a status transition diagram of the operation of the system shown in FIG. 7.
Figure 9:
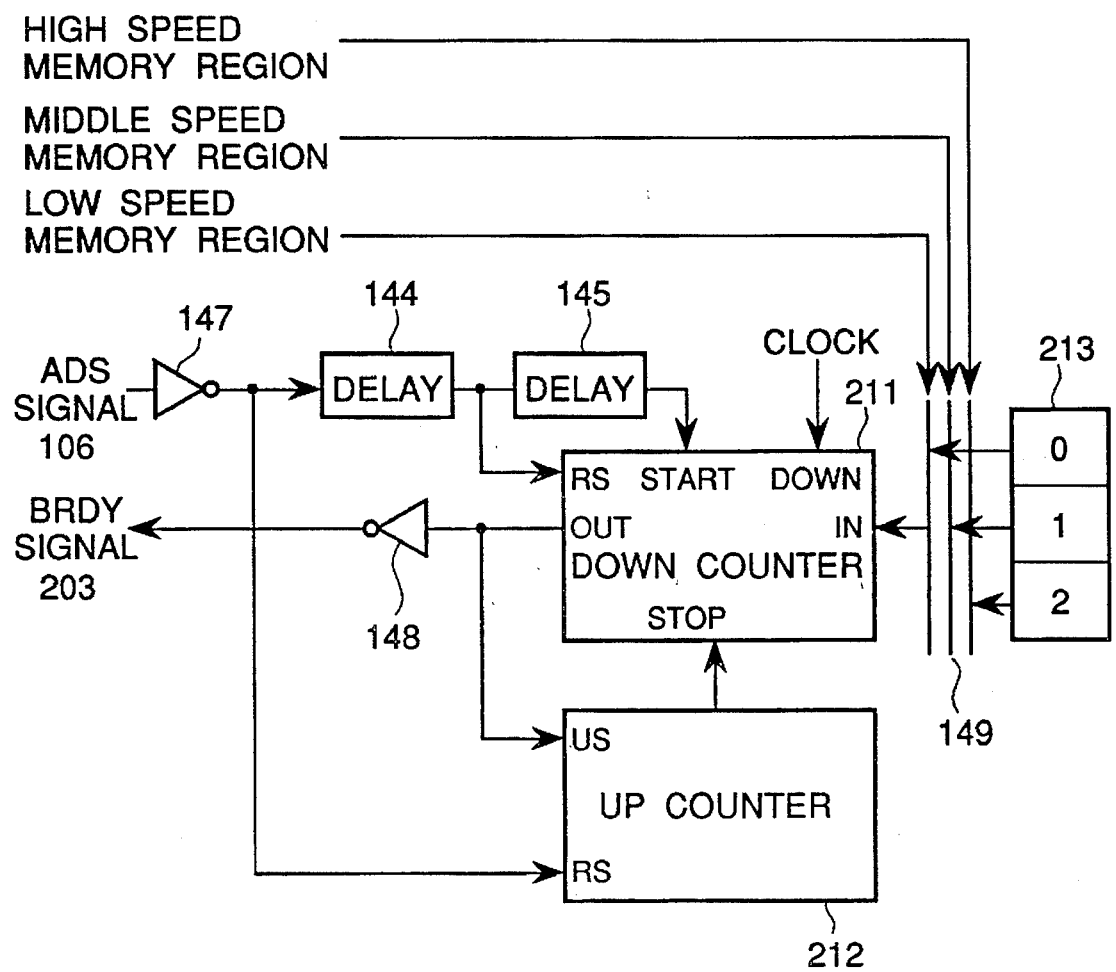
FIG. 9 is a circuit diagram showing one example of the BRDY signal generating circuit included in the system shown in FIG. 7.
Figure 10:
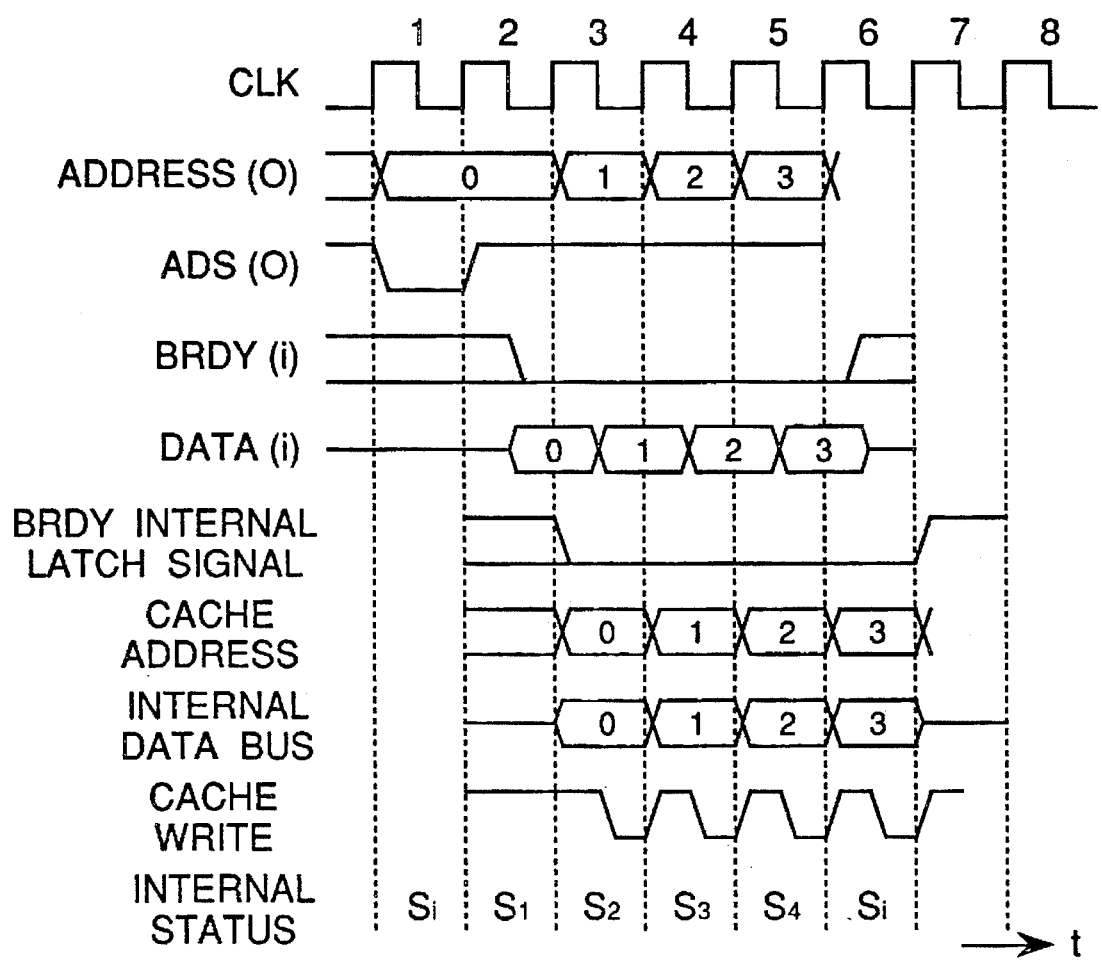
FIG. 10 is a timing chart of an asynchronous burst mode transfer in the system shown in FIG. 7.
Figure 11:
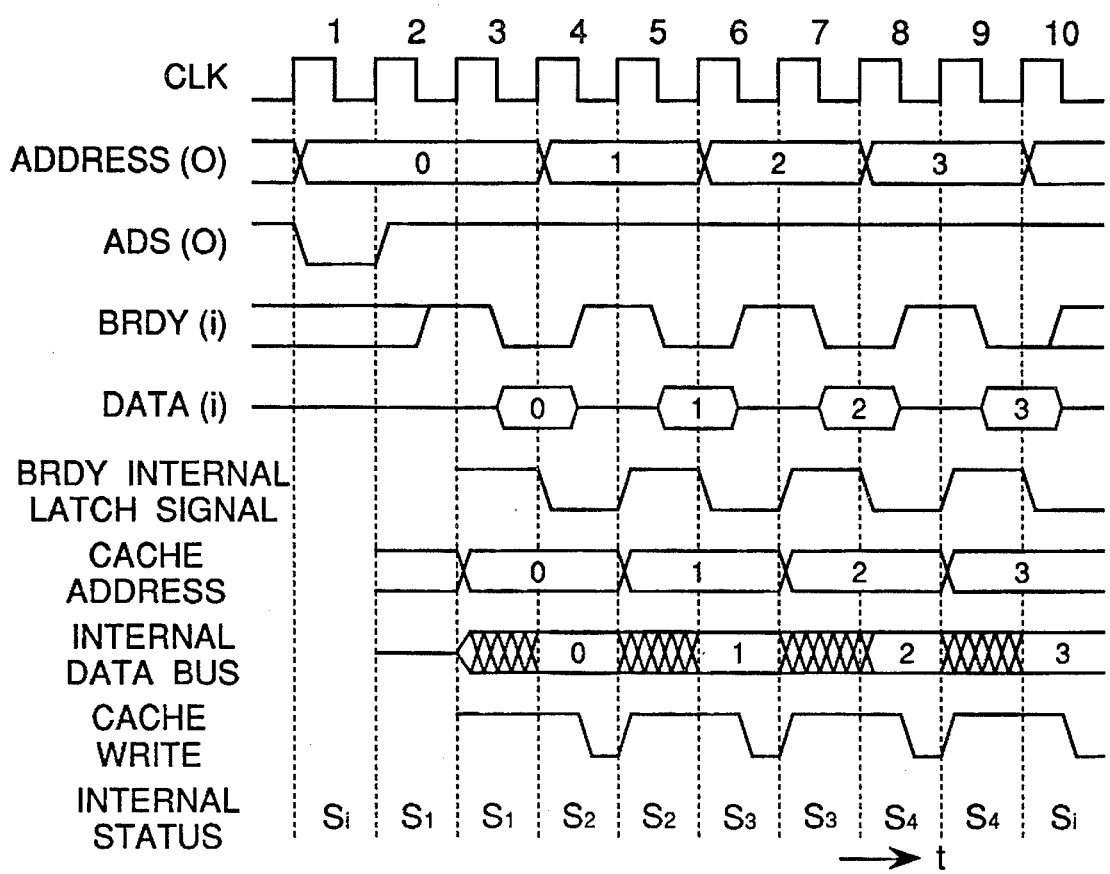
FIG. 11 is a timing chart of another asynchronous burst mode transfer in the system shown in FIG. 7.
Figure 13:
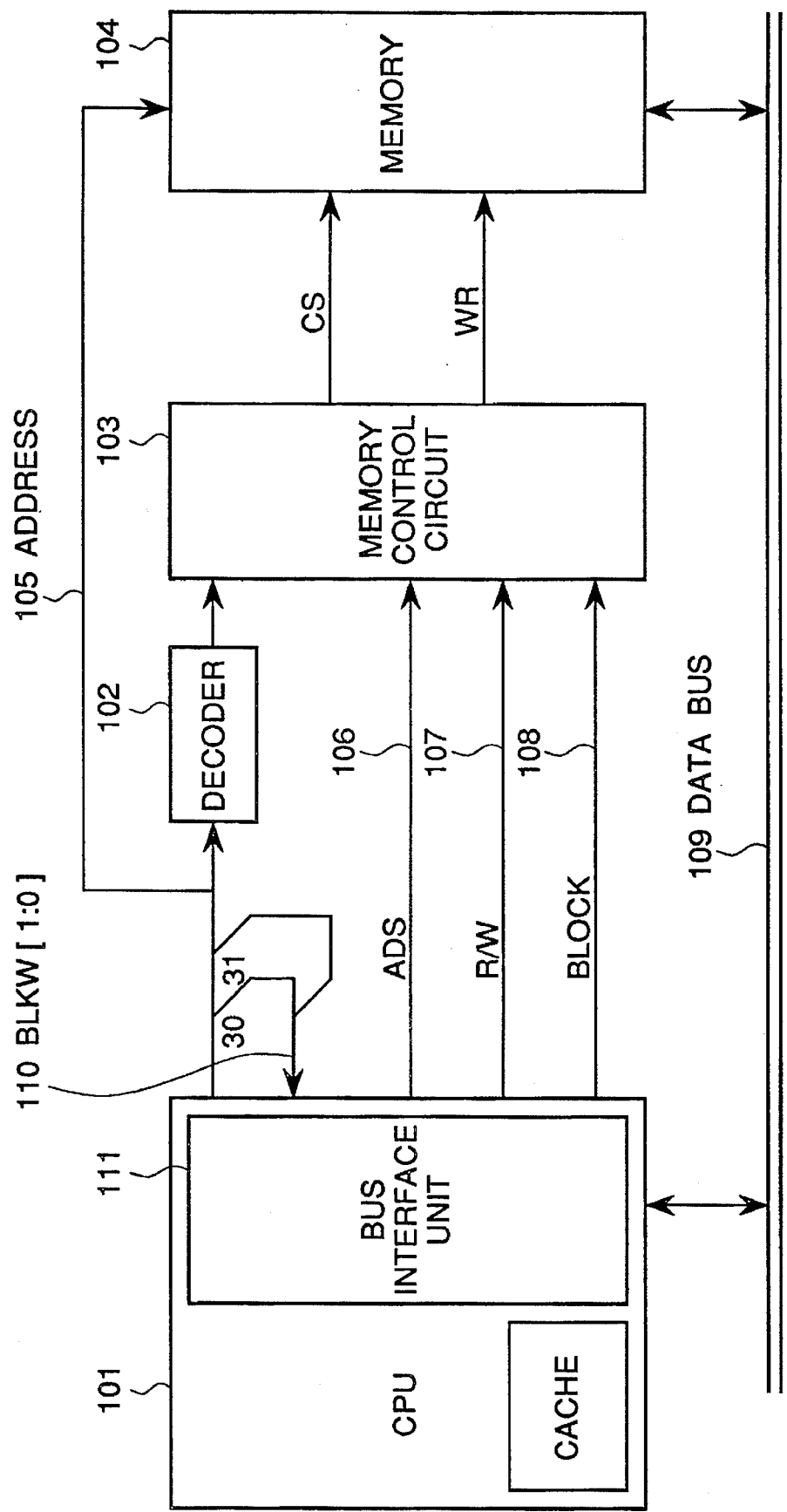
FIG. 13 is a block diagram of a first embodiment of the data processing system in accordance with the present invention capable of transferring data between a microprocessor and a memory.
Figure 14:
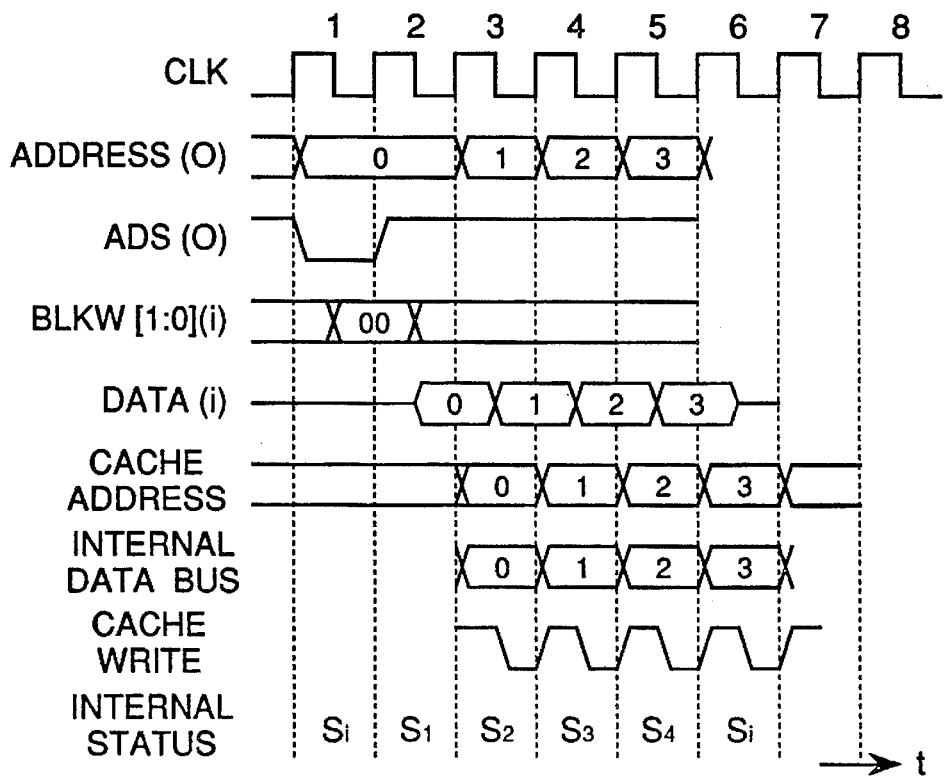
FIG. 14 is a timing chart of a burst mode transfer in the system shown in FIG. 13.
Figure 15:
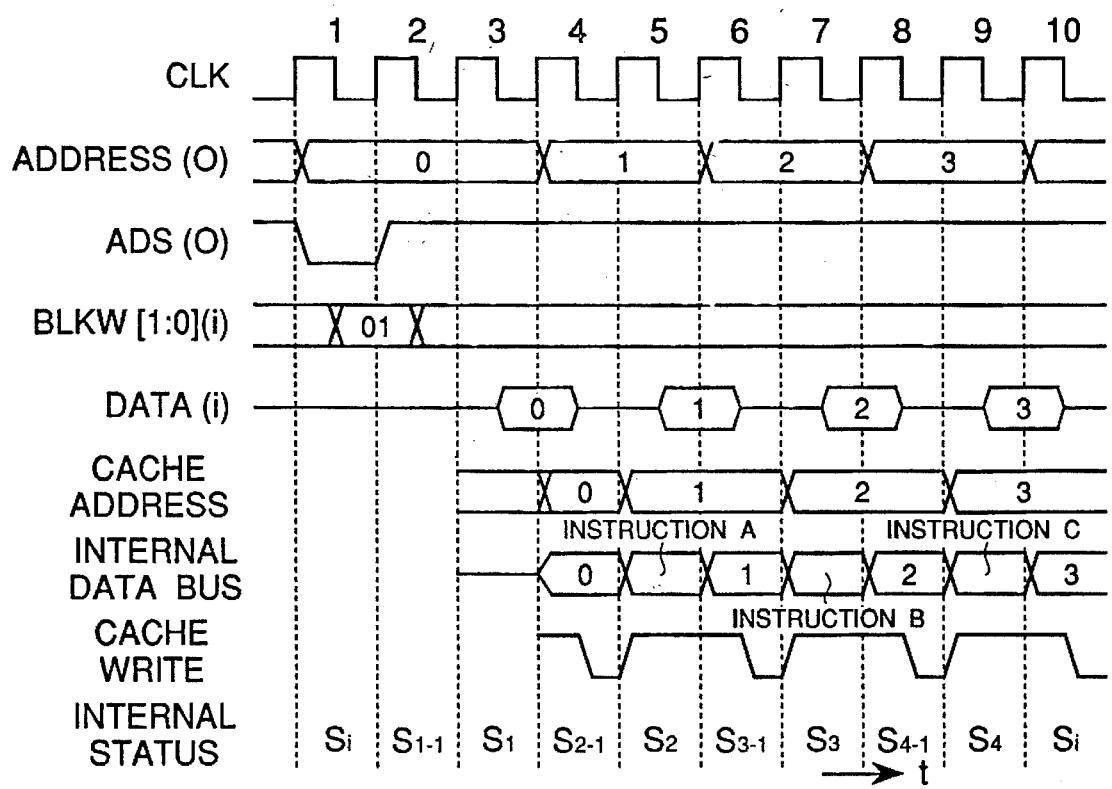
FIG. 15 is a timing chart of another burst mode transfer in the system shown in FIG. 13.

Referring to FIG. 13, there is shown a block diagram of a first embodiment of the data processing system in accordance with the present invention capable of transferring data between a microprocessor and a memory. In FIG. 13, elements similar to those shown in FIG. 1 are given the same Reference Numerals. p The shown system is so configured that a burst mode transfer period designating signal 110 is composed of two signal lines. FIG. 14 shows a timing chart of a one-clock period burst mode transfer in the first embodiment, and FIG. 15 shows a timing chart of a two-clock period burst mode transfer in the first embodiment.

In the first embodiment, the microprocessor 101 internally including a cache memory CACHE, outputs an effective address 105, and at the same time, activates a bus cycle start signal (ADS) 106 and a read/write signal (R/W) 107. An address decoder 102 decodes the received address and discriminates an address designated region. In addition, depending upon the memory 104 in the address designated region, the burst mode transfer period is designated by the burst mode transfer period designating signal (BLKW[1:0]) 110, which is composed of the most significant two bits A[31: 30] of the address 105.

The address decoder 102 decodes the most significant two bits A[31: 30] of the address 105, similarly to the conventional examples explained hereinabove. In this embodiment, the BLKW[1:0] signal 110 is formed of two bits, the most significant two bits A[31: 30] of the address 105 can be used as the BLKW[1: 0] signal 110, without modification and without intermediary of the address decoder 102. The memory control circuit 103 receives the ADS signal 106 and the R/W signal 107, and controls the memory 104.

Figure 16:
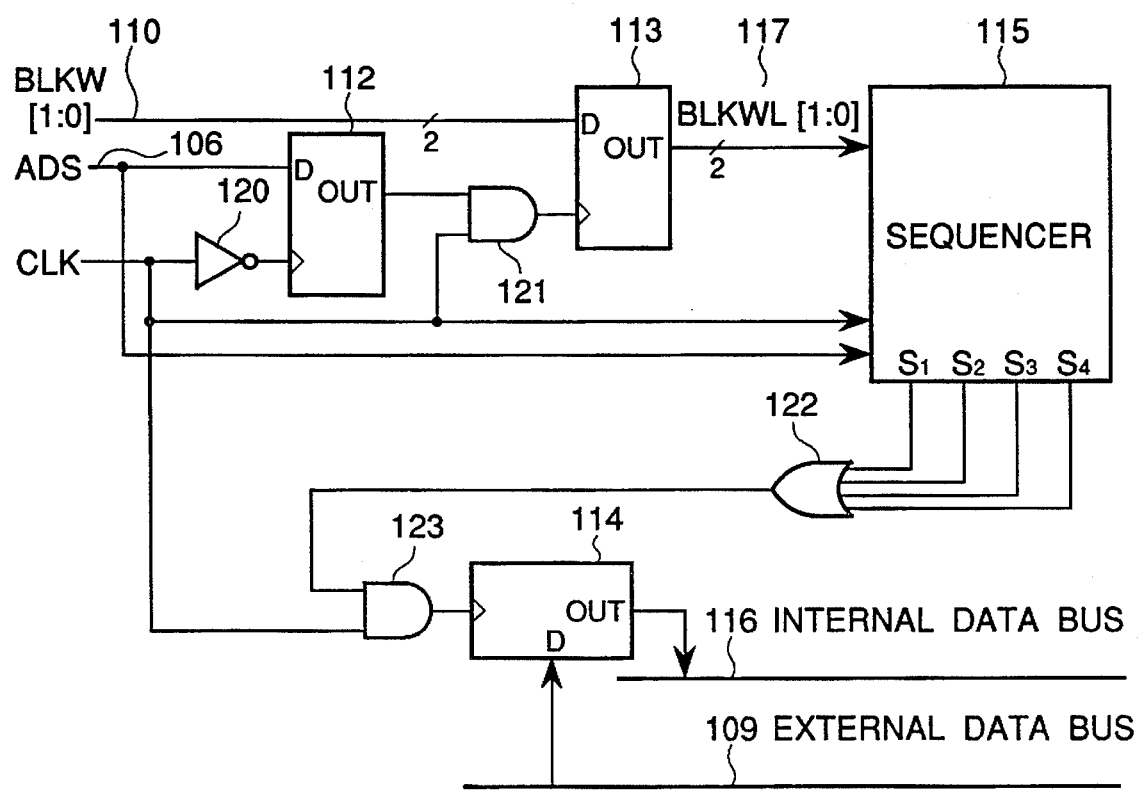
FIG. 16 is a circuit diagram showing one example of the bus interface unit included in the microprocessor shown in FIG. 13.

The microprocessor 101 internally includes a bus interface unit 111, which can be formed of for example a circuit shown in FIG. 16. The bus interface unit 111 includes flipflops 112 and 113, a read buffer 114, a sequencer 115, an inverter 120, AND circuits 121 and 123 and an OR circuit 122, which are connected as shown in FIG. 16. This circuit 111 uses a strobe signal obtained by delaying the ADS signal 106 by a half period of the clock CLK by the inverter 120 and the flipflop 112, and the BLKW[1: 0] signal 110 is fetched into the flipflop 113 at a rising edge of a clock after one clock from the outputting of the address 105. The output of the flipflop 113 is outputted as a BLKWL[1: 0] signal 117 to the sequencer 115 which controls the status transition of the microprocessor. In accordance with the status transition, data is fetched from the external bus 109 through the read buffer 114 to an internal data bus 116.

Figure 17:
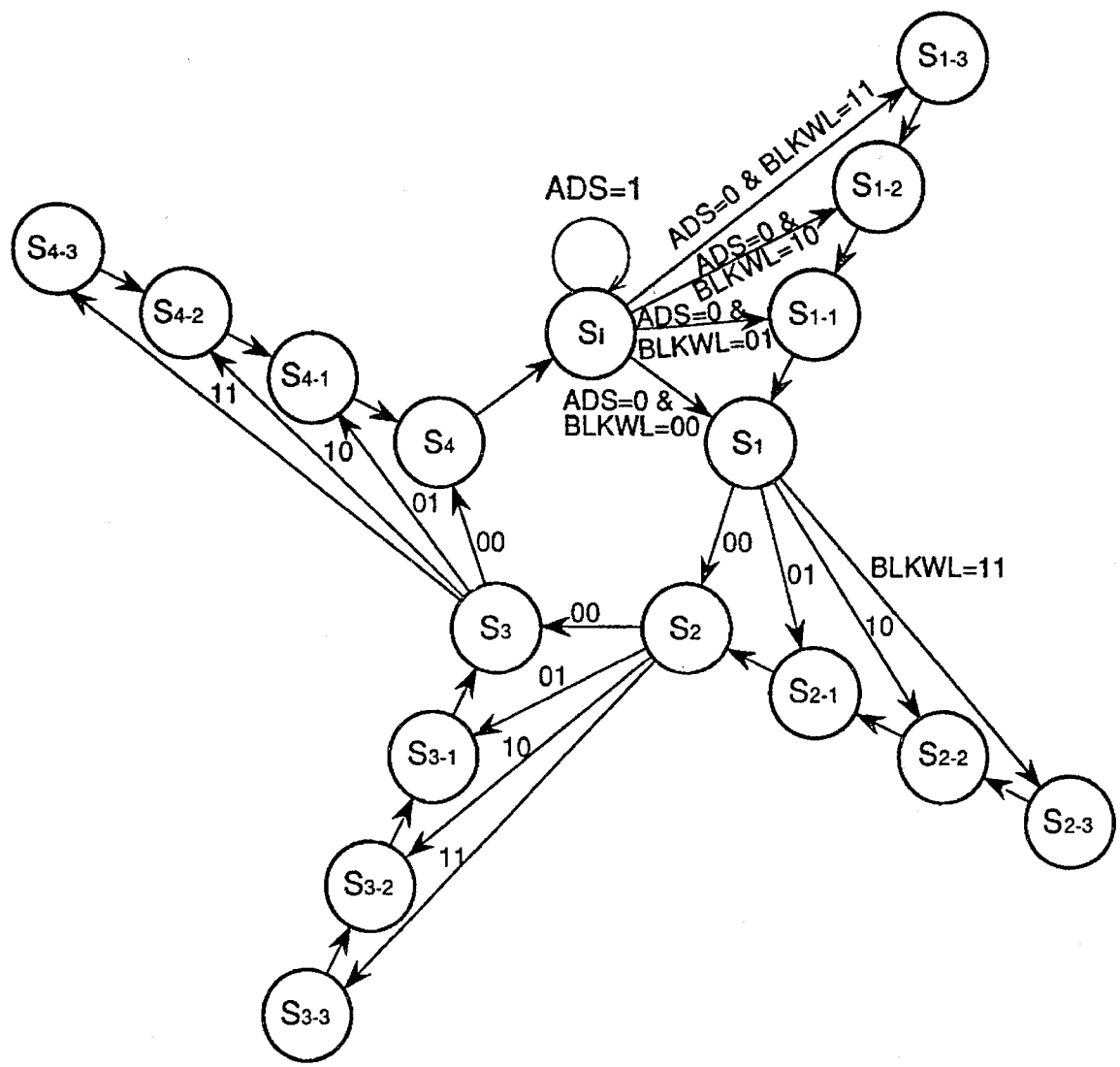
FIG. 17 is a status transition diagram of the operation of the system shown in FIG. 13.

With this arrangement, one status transition is straightly determined from a plurality of status transitions in accordance with the value of the fetched BLKW[1: 0] signal 110. Therefore, the status transition of the sequencer is in synchronism with the clock, and becomes as shown in FIG. 17.

In addition, by counting the number of cycles from the outputting of the address, the status transition becomes as shown in the following Table 1. Therefore, the memory control circuit 103 can know the status. In the following Table 1, S1, S2, S3 and S4 show a cycle for fetching data "0", "1", "2" and "3", respectively, and the other cycles shows a wait cycle.

TABLE 1

| COUNT | BLKW=0 | BLKW=1 | BLKW=2 | BLKW=3 |
|---|---|---|---|---|
| 1 | Si | Si | Si | Si |
| 2 | $S_1$ | $S_{1-1}$ | $S_{1-2}$ | $S_{1-3}$ |
| 3 | $S_2$ | $S_1$ | $S_{1-1}$ | $S_{1-2}$ |
| 4 | $S_3$ | $S_{2-1}$ | $S_1$ | $S_{1-1}$ |
| 5 | $S_4$ | $S_2$ | $S_{2-2}$ | $S_1$ |
| 6 | | $S_{3-1}$ | $S_{2-1}$ | $S_{2-3}$ |
| 7 | | $S_3$ | $S_2$ | $S_{2-2}$ |
| 8 | | $S_{4-1}$ | $S_{3-2}$ | $S_{2-1}$ |
| 9 | | $S_4$ | $S_{3-1}$ | $S_2$ |
| 10 | | | $S_3$ | $S_{3-3}$ |
| 11 | | | $S_{4-2}$ | $S_{3-2}$ |
| 12 | | | $S_{4-1}$ | $S_{3-1}$ |
| 13 | | | $S_4$ | $S_3$ |
| 14 | | | | $S_{4-3}$ |
| 15 | | | | $S_{4-2}$ |
| 16 | | | | $S_{4-1}$ |
| 17 | | | | $S_4$ |

In this embodiment, since the writing of the data can be predicted, the internal data bus 116 can be used for another purpose in cycles other than the cache memory write cycles. For example, an instruction cache and a data cache are connected to the same internal bus, and when data is written into the data cache from an external bus, the instruction cache can be read in empty bus cycles, for example, as in "INSTRUCTION A", "INSTRUCTION B" and "INSTRUCTION C" in the bus cycle "INTERNAL DATA BUS" in FIG. 15. This makes it possible to reduce the internal wiring within the microprocessor.

Figure 18:
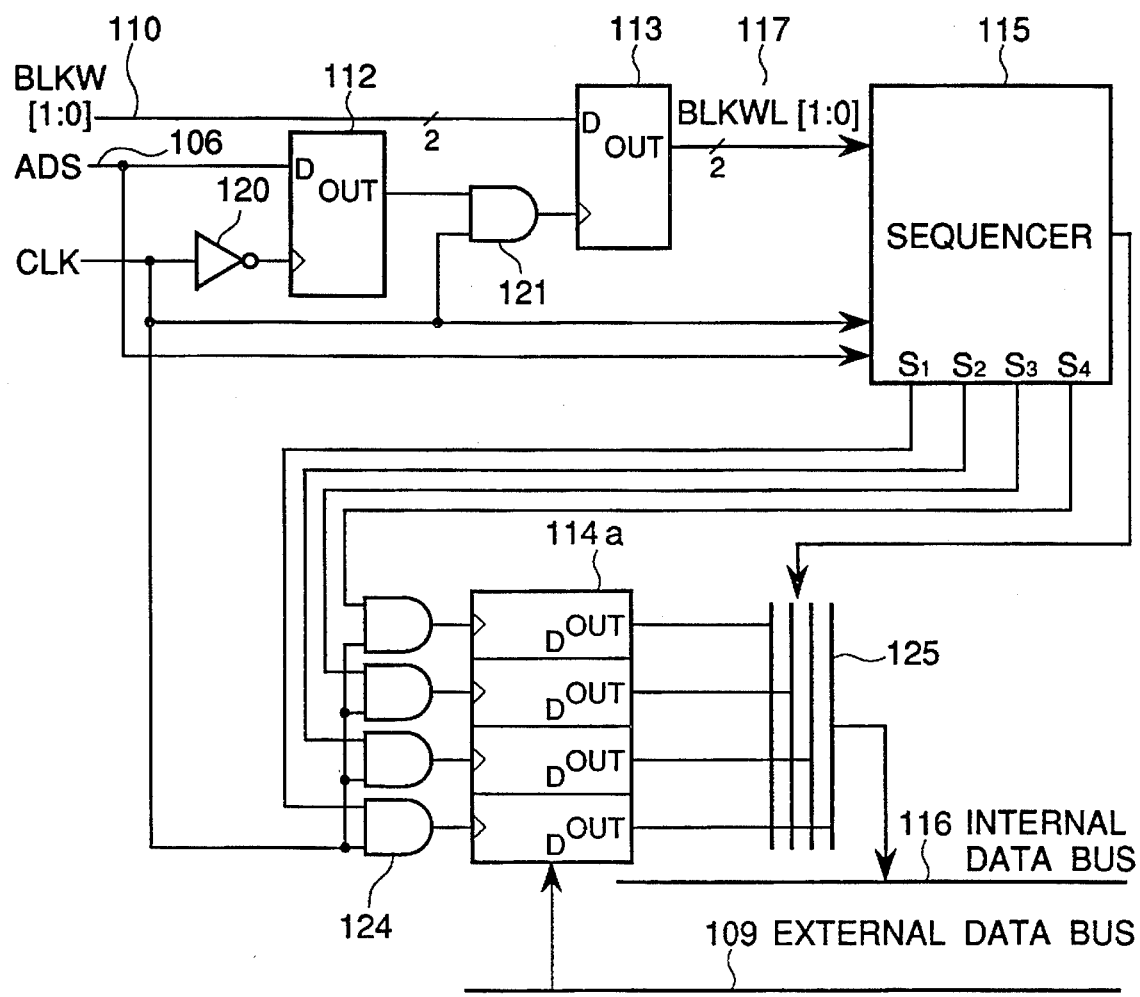
FIG. 18 is a circuit diagram showing another example of the bus interface unit which is included in the microprocessor shown in FIG. 13 and which included four stages of read buffer.

If the microprocessor 101 includes four stages of read buffer, the bus interface unit 111 is constituted as shown in FIG. 18, in which the OR circuit 122 is removed, and the read buffer 114 is replaced with four stages of read buffer 114a, each of which has a data input connected to the external data bus 109, and a data output connected to the internal data bus 116 through a selector 125 controlled by the sequencer 115 so that only one stage of read buffer is connected to the internal data bus 116 at a time. The four stages of read buffer 114a receive the control signal S1, S2, S3 and S4 of the sequencer 115, respectively, through corresponding AND circuits 124.

Figure 19:
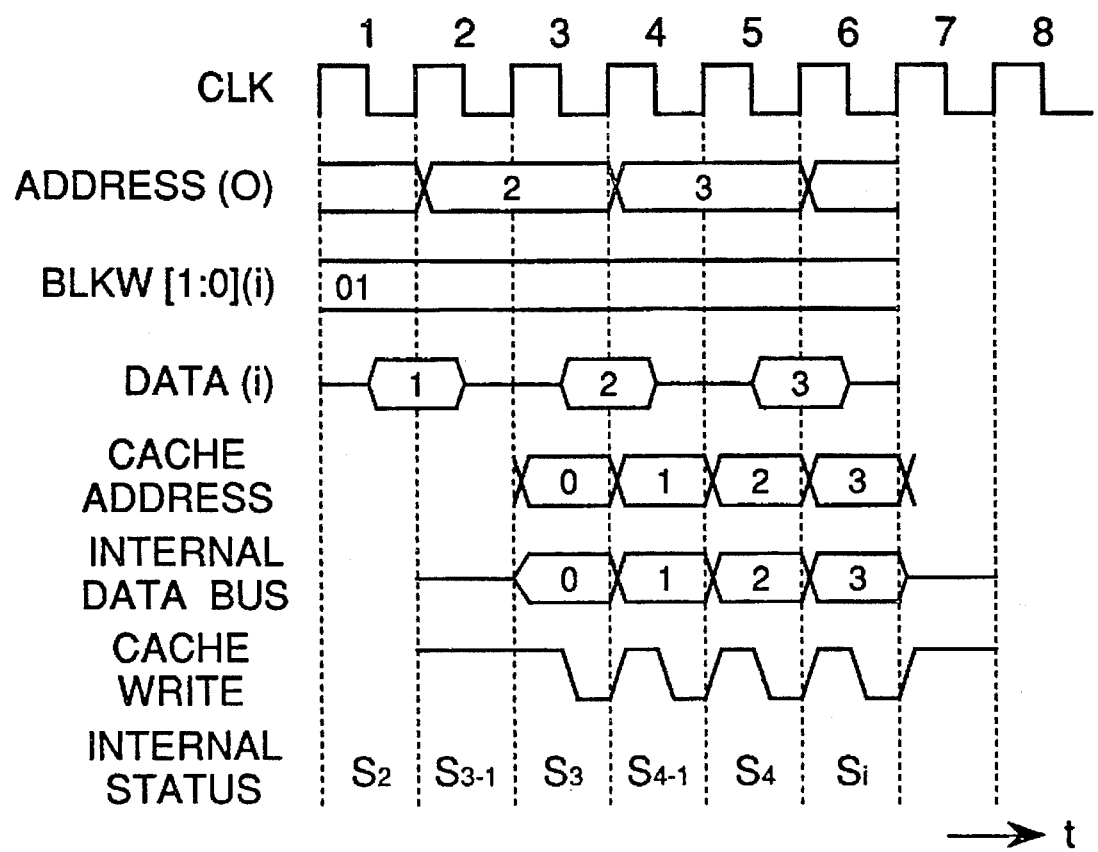
FIG. 19 is a timing chart of the burst mode transfer in the system shown in FIG. 13 having the four stages of read buffer.

The operation timing of this modification is shown in FIG. 19.

Data read from the external bus (for example, from the memory 104) is stored and accumulated in the four stages of read buffer 114a, and only when four items of data become complete in the four stages of read buffer 114a, can the four items of data be continuously written into a cache memory. Therefore, it is possible to simplify the control of the cache access, and to speed up the writing to the cache.

Figure 20:
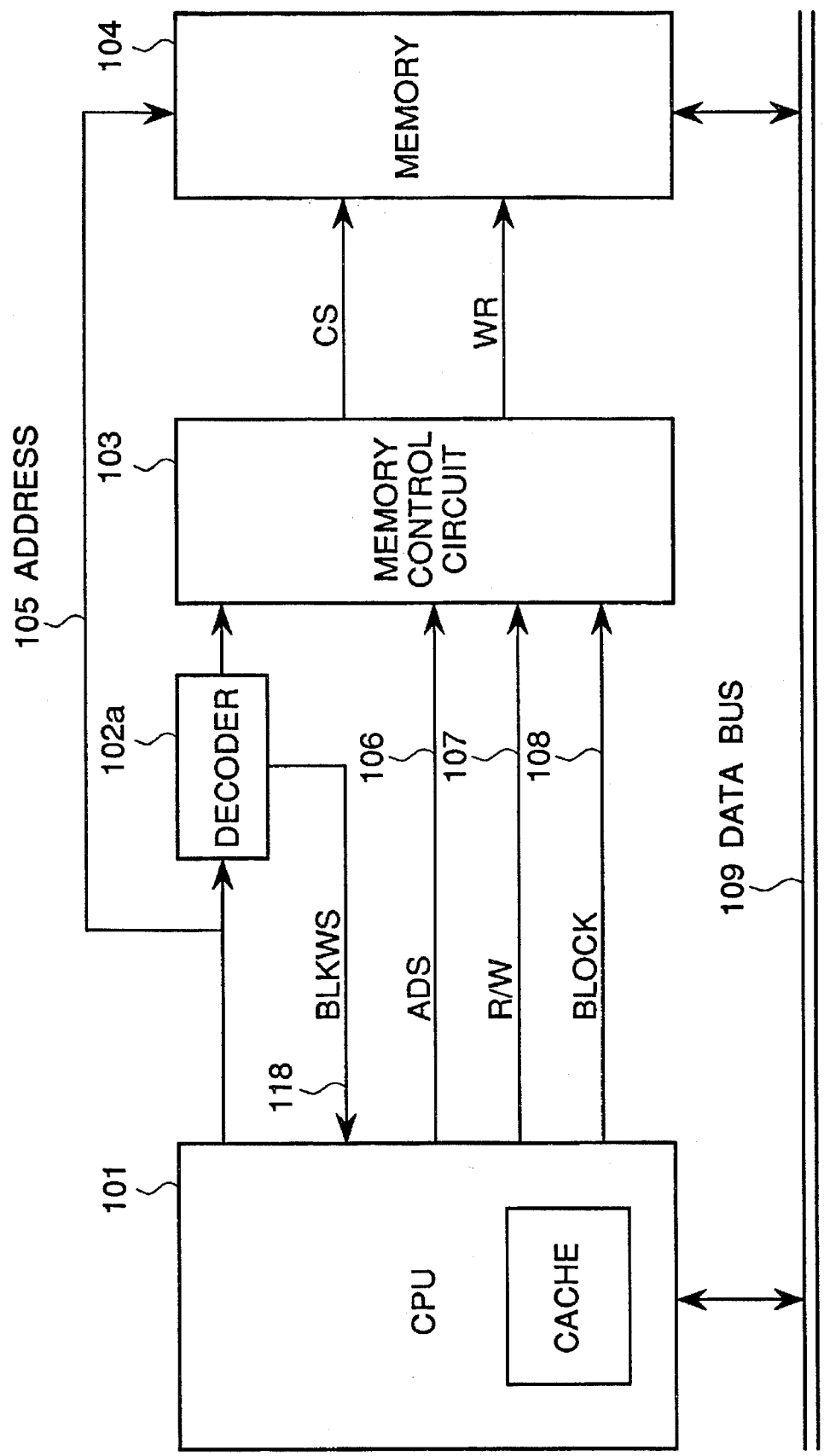
FIG. 20 is a block diagram of a second embodiment of the data processing system in accordance with the present invention capable of transferring data between a microprocessor and a memory.
Figure 21:
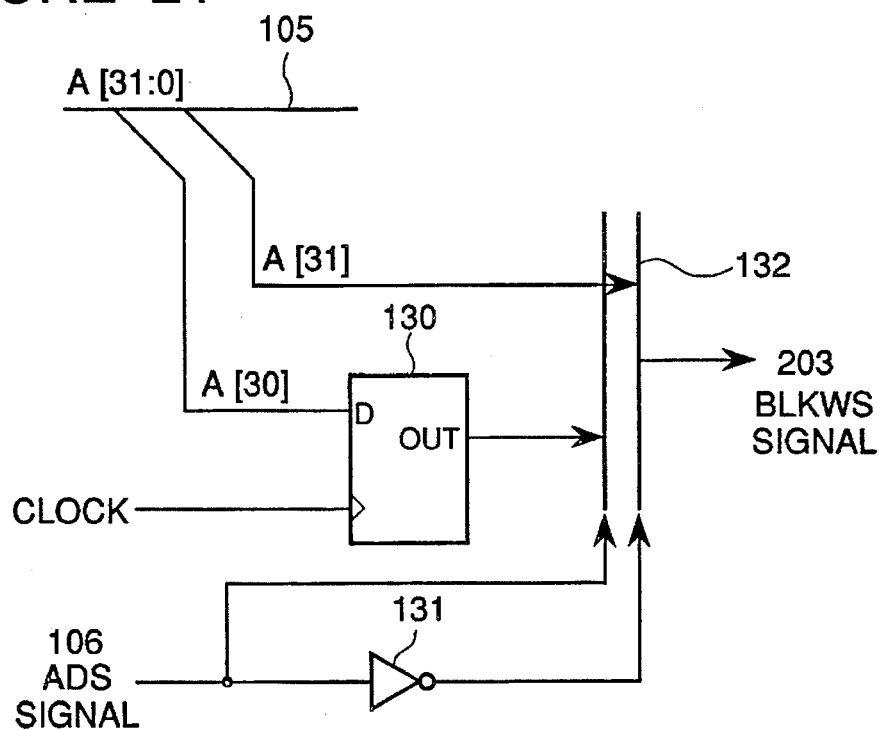
FIG. 21 is a circuit diagram showing one example of the BLKWS signal generating circuit included in the system shown in FIG. 13.

FIG. 20 shows a block diagram of the second embodiment of the data processing system in accordance with the present invention.

The second embodiment is configured so that a burst mode transfer period designating signal (BLKWS) 118 constitutes a single line, and the burst mode transfer period is designated during a few continuous clocks. Excepting for this burst mode transfer period designating manner, the second embodiment is the same as the first embodiment.

Referring to FIG. 212, there is shown a circuit for generating the BLKWS signal 118. This circuit receives the most significant two bits A[31: 30] of the address 105 and the ADS signal 106, and includes a flipflop 130, an inverter 131 and a selector 132 connected as shown. The BLKWS signal 118 is generated by selecting, on the basis of the ADS signal 106, either the most significant two bits A[31] of the address 105 or a signal obtained by delaying the next most significant two bits A[30] of the address 105 by one clock.

Figure 22:
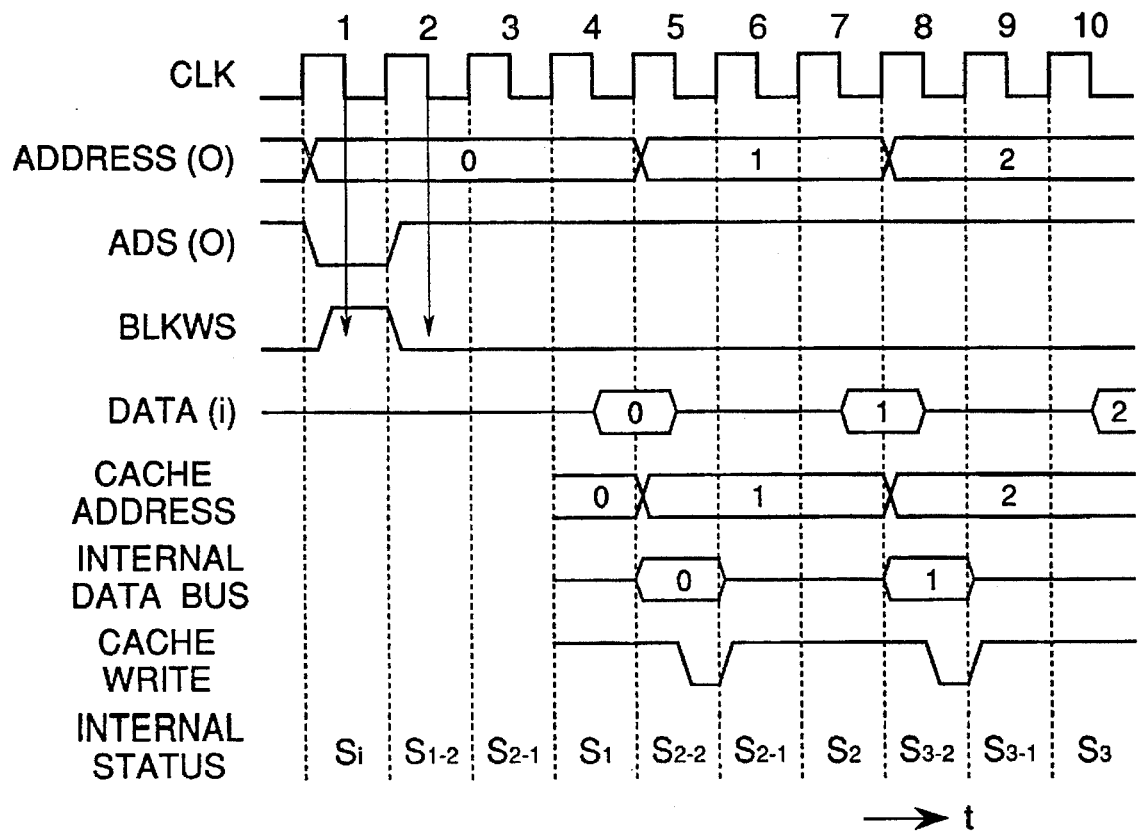
FIG. 22 is a timing chart of a burst mode transfer in the system shown in FIG. 20.

FIG. 22 shows the timing chart of the three-clock period burst mode transfer of the second embodiment. The BLKSW signal 118 is fetched after 0.5 cycle and after 1.5 cycles from the outputting of the address, and the status transition is performed at the designated period so as to fetch the data.

As seen from the above, the data processing system in accordance with the present invention can dynamically change the burst mode transfer period dependent upon the performance of the memory. Therefore, the data processing system in accordance with the present invention can comply with any memory without lowering the operating frequency, which has been required in the first conventional example. Therefore, the data processing system in accordance with the present invention can reduce the system cost. In addition, the data processing system in accordance with the present invention can change the burst mode transfer period without requiring a complicated external counter circuit, which was needed in the second conventional example. In this point, the data processing system in accordance with the present invention can reduce the system cost.

Furthermore, in the data processing system in accordance with the present invention, it is possible to predict the fixing of the data in the synchronous burst mode transfer. Therefore, in a time excluding the cache memory writing time, the internal data bus can be utilized for another purpose, and accordingly, the internal wirings can be reduced. In this point, the system performance can be elevated.

Figure 12:
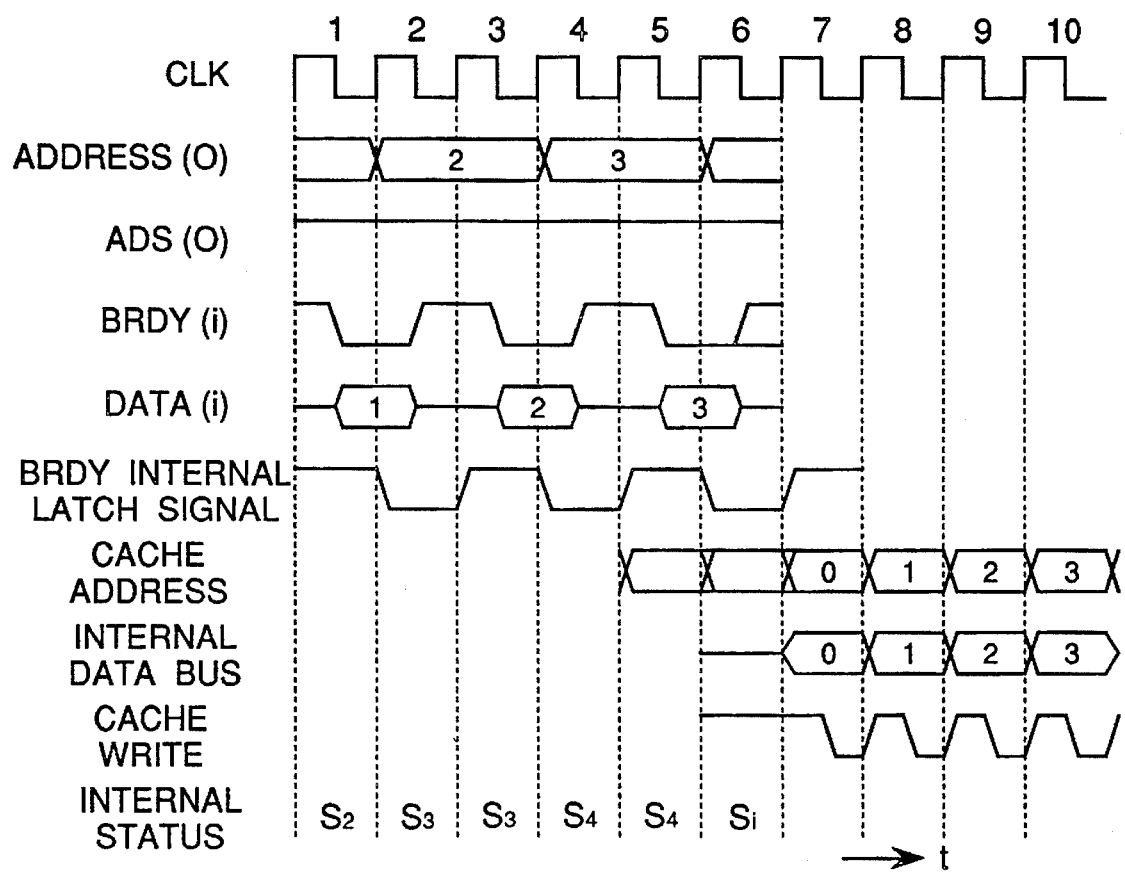
FIG. 12 is a timing chart of the data transfer in the system shown in FIG. 7 in the case that the cache writing is continuously performed

In the modification of the first embodiment, the writing into the cache memory can be advanced in view of the timing of the last data fetching. In comparison with the asynchronous burst mode transfer shown in FIG. 12 of the second conventional example, the writing into the cache memory can be speeded up by four clocks, and the control of the cache can be simplified.

The invention has thus been shown and described with reference to the specific embodiments. However, it should be noted that the present invention is in no way limited to the details of the illustrated structures but changes and modifications may be made within the scope of the appended claims.

I claim:

1. A data processing system comprising:

a microprocessor having a burst mode transfer function and supplying an address for designating data;

a memory receiving said address supplied from said microprocessor to output data designated by the received address;

an address decoder receiving and decoding said address supplied from said microprocessor;

a memory control circuit receiving an output of said address decoder and control signals from said microprocessor, for controlling said memory; and burst mode transfer period designating means which receives said address from said microprocessor and generates a burst mode transfer period designating signal from said address, independently of said memory control circuit, indicating a period of a burst mode transfer, so that at the time of said burst mode transfer, a synchronous burst mode transfer of said data from said memory is performed in accordance with the period of the burst mode transfer designated by said burst mode transfer period designating signal;

said microprocessor fetching said data transferred from said memory by the synchronous burst mode transfer.

2. A data processing system as claimed in claim 1 wherein said burst mode transfer period designating means includes "n" burst mode transfer period designating input terminals, and said synchronous burst mode transfer is performed in accordance with one period of "2ⁿ" different periods designated by "n" burst mode transfer period designating signals simultaneously fetched through said "n" burst mode transfer period designating input terminals, respectively.

3. A data processing system as claimed in claim 1 wherein said burst mode transfer period designating means includes a single burst mode transfer period designating input terminal, and said synchronous burst mode transfer is performed by changing said burst mode transfer period designating signal during a few continuous clocks so as to designate the burst mode transfer period.

4. A data processing system as claimed in claim 1 wherein an internal bus interface unit of said microprocessor fixes its status transition in accordance with said burst mode transfer period designating means, so that an internal bus is open to another internal unit in an internal bus empty time slot during the burst mode transfer period.

5. A data processing system as claimed in claim 1 wherein said microprocessor includes said designating means.

6. A data processing system as claimed in claim 1 wherein said decoder includes said designating means.

7. A data processing system as claimed in claim 1 wherein said microprocessor fetches all said data transferred from said memory by the synchronous burst mode transfer.

8. A data processing system as claimed in claim 1 wherein said memory comprises:

a high speed memory region, a medium speed memory region and a low speed memory region; and said data output from all said regions of said memory is transferred by the synchronous burst mode transfer.

9. A data processing system comprising:

a microprocessor supplying a memory address signal including an address of stored data and a designation signal for designating a period of burst mode transfer, said microprocessor including cache storage;

a decoder for receiving and decoding said memory address signal and for outputting a decoded address signal;

a memory control circuit for receiving said decoded address signal and for outputting memory control signals;

a memory including a high speed storage region operating at a high speed to supply high speed data and a lower speed storage region operating at a lower speed than said high speed to supply lower speed data, said memory responding to said memory address signal and said memory control signals for outputting said high speed data and said lower speed data; and synchronous burst mode transfer means, responding independently of said memory control circuit to said designation signal for said period of burst mode transfer from said memory address signal supplied from said microprocessor, for transferring said high speed data and said lower speed data in a synchronous burst mode transfer from said memory to said cache storage.

10. A data processing system as in claim 9 wherein said transfer means comprises sequencer means, responsive to said designation signal from said microprocessor, for generating sequential control signals for controlling status transition of said microprocessor for transfer of said high speed and lower speed data from said memory.

11. A data processing system as in claim 10 wherein said sequencer means generates said sequential control signals for transferring said data during each n th clock cycle of said microprocessor where n is any integer.

12. A data processing system as in claim 10 wherein said transfer means comprises an internal bus;

said sequencer means generates said sequential control signals for transferring said data over said internal bus to said cache storage during each n th clock cycle of said microprocessor; and for n>1, said transfer means releases control of said internal bus during clock cycles other than said each n th clock cycle.

13. A data processing system as in claim 10 wherein said transfer means comprises buffer means, responsive to said sequential control signals, for holding said high speed and lower speed data prior to writing said cache storage.

14. A data processing system as in claim 13 wherein said buffer means comprises a plurality of buffers, respective ones of said buffers being responsive to respective ones of said sequential control signals, and said transfer means includes selector means, controlled by said sequential control signals, for continuously writing said cache storage from said buffers when all said buffers accumulate data from said memory.

15. A data processing system as in claim 9 wherein said decoder additionally receives said designation signal from said microprocessor and supplies said designation signal to said transfer means independently of said memory control circuit.

16. A data processing system as in claim 15 wherein said designation signal comprises successive bits of said address and said decoder further comprises selector means for supplying said successive bits to said transfer means.

* * * * *